Patented Dec. 15, 1931

1,836,553

UNITED STATES PATENT OFFICE

WILHELM PUNGS, KARL EISENMANN, AND JOHANN KUCHENBUCH, OF LUDWIGS-HAFEN-ON-THE-RHINE, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

PRODUCTION OF CONDENSATION PRODUCTS OF CARBAMIDES AND FORMALDEHYDE

No Drawing. Application filed June 12, 1929, Serial No. 370,453, and in Germany June 25, 1928.

The present invention relates to the manufacture and production of condensation products of carbamides and formaldehyde. Various processes for the production of condensation products by a condensation of urea or of another carbamide with formaldehyde are known in the art. The condensation has been performed in the presence or absence of water or also in the presence of organic solvents dissolving the reaction products. Instead of a urea and formaldehyde a methylol urea such as mono- or di-methylol urea has been employed and also products resulting from these by splitting off water.

We have now found that particularly valuable condensation products of carbamides and formaldehyde are obtained by mixing the solutions of the condensation products of urea or derivatives thereof and formaldehyde or polymers thereof prepared in organic media comprising solvents with alcoholic radicles such as mono- or poly-hydric aliphatic aromatic or hydroaromatic alcohols or their derivatives such as esters or ethers, containing at least one free alcoholic group with liquids which have a precipitating action on the carbamide formaldehyde condensation products, or by carrying out the original condensation in liquids in which the condensation product obtained does not dissolve, but in which it remains suspended in a solid form, as for example in dioxane (diethylene 1.4 dioxide) or its homologues, alkyl ethers of phenols, such as anisol, di-alkyl ethers of glycols or in hydrocarbons or mixtures containing a substantial proportion thereof, such as turpentine oil.

The precipitants are for the most part the same substances as those in which the aforesaid condensation without dissolution of the condensation products can be carried out, for example, aliphatic, aromatic and hydroaromatic hydrocarbons, and ethers, preferably those of a low boiling point, of the type R—O—R' in which R and R' may be alkyl or aryl radicles, but any other liquid organic compound showing a precipitating action may be employed. In contrast to the ethers containing free hydroxyl groups mentioned above the ethers of the type R—O—R' will be referred to as neutral ethers.

It is preferable to carry out the precipitation or condensation in such a manner, for example by employing an ample amount of precipitant that the condensation products are obtained in a finely pulverulent state, in which state they can be easily and completely freed from the adhering solvents or suspending agents employed in the condensation by thorough washing with easily volatile organic liquids in which the condensation products are not soluble, and they may then be easily dried. According to this process, condensation products of carbamides and formaldehyde are obtained which do not contain organic solvents, free formaldehyde or moisture.

The products obtained by precipitating after the condensation are soluble in many organic solvents, especially in organic compounds which contain one or more free hydroxyl groups such as monohydric or polyhydric alcohols and derivatives thereof, and also in dioxane or its homologues, aldehydes and ketones, especially those of a high molecular weight such as furfural and cyclohexanone, but also in acetals, such as di-alkyl acetal, ethers of a higher molecular weight, such as anisol, and esters, such as butyl acetate.

Carbamide formaydehyde condensation products prepared in different solvents differ in their properties, in some cases to a considerable degree and in particular as regards stability to water.

Thus, for example, products obtained by a condensation in methyl or ethyl alcohol, in mono ethers of glycol or also in polyhydric alcohols, are rather sensitive to water. On the other hand products obtained from reaction mixtures containing higher monohydric alcohols, and in particular those which contain 4, 5 and 6 carbon atoms, or benzyl alcohol are scarcely attacked by water at all, but they have the drawbacks that in working them up as lacquers or artificial masses they frequently still retain the smell of the solvent, the volatility of which is too small in some cases for an easy and thorough removal thereof.

These drawbacks can be avoided in a simple manner. It has been found that the properties of the precipitated condensation products acquired by the employment of the said higher alcohols in the condensation process are retained when dissolving them in another solvent. Thus in order to prepare a laquer which will produce coatings capable of resisting water when dried, a carbamide formaldehyde condensation product is prepared in a higher monohydric alcohol for example according to the aforesaid applications and is precipitated from the solution by the addition of a suitable precipitant for example ethyl ether, and then is redissolved in a liquid having a suitable volatility and, preferably only a slight smell, for example glycolmonomethyl ether. Instead of one solvent, mixtures of several solvents, which may also contain limited quantities of water, may be employed. Even a small addition of water to the solution of a precipitated condensation product of a carbamide and formaldehyde in a solvent which is miscible with water, has no influence on the properties of the final products made therefrom, such as lacquers. The choice of solvent is made according to the desired velocity of drying of the lacquer and the like and according to the other additional substances, such as cellulose esters, softening agents and the like which are also to be dissolved.

The pulverulent condensation product of carbamides and formaldehyde obtained by precipitation, or by condensation in a liquid in which the condensation product is not soluble can be pressed preferably at an elevated temperature into transparent homogeneous pieces which are free from moisture, formaldehyde and organic solvents and which consequently do not exhibit the phenomena of aging, such for example as cracks and the like, if desired with the addition of fillers, colouring materials, softening agents and the like.

In the place of a urea and formaldehyde the corresponding mono- or di-methylol may be employed which can be obtained by condensing the urea chosen and formaldehyde under mild conditions, preferably with the aid of an alkaline agent, which methylol compounds are therefore considered as equivalents of urea and formaldehyde.

The following examples will further illustrate the nature of the invention but the invention is not restricted to these examples. The parts are by weight.

Example 1

2000 parts of urea are dissolved at from 90° to 100° C. in 1600 parts of commercial ethyl alcohol whereupon 24 parts of a concentrated hydrochloric acid are added. This solution is then slowly added to a solution of 2300 parts of gaseous formaldehyde in 9000 parts of amylalcohol heated to 110° C. The mixture is then stirred and after the reaction, the clear solution is neutralized by adding 100 parts of tertiary sodium phosphate.

200 parts of this solution are stirred at ordinary temperature with 5 to 10 times the weight of petroleum ether of a boiling point of about 40° centigrade. After stirring for a short time, the whole is allowed to settle and the supernatant liquor drawn off; the precipitated condensation product is then treated with 250 parts of ethyl ether, vigorously stirred for some time and filtered off. The fine powder of the precipitated product is then washed several times with ethyl ether and then dried in vacuo at 50° centigrade. The urea formaldehyde condensation product so obtained is dissolved at about room temperature in $n$-propyl alcohol while stirring so that a 40 per cent solution is obtained, and this solution diluted with ethyl alcohol to produce a 20 per cent solution.

A quickly drying lacquer having only a slight smell is obtained, coatings of which are scarcely attacked by water.

A condensation product of thiourea and formaldehyde may be employed instead of the aforesaid urea formaldehyde condensation product.

Example 2

50 parts of an approximately 40 per cent solution of a condensation product of dimethylol thiourea prepared in benzyl alcohol are stirred for a short time with 500 parts of ethyl ether. After allowing the precipitated condensation product to settle the supernatant liquid is drawn off, the precipitate again stirred with 50 parts of ethyl ether for some time, and further worked up as described in Example 1. The finely powdered urea formaldehyde condensation product so obtained is dissolved while stirring in glycol monoethyl ether at about 80° centrigrade, so that a 50 per cent solution is obtained, and this is diluted with ethyl alcohol to produce a 20 per cent solution. The laquer so obtained gives clear coatings which are stable to water. If desired cellulose esters such as cellulose nitrate and softening agents may also be incorporated in this lacquer.

Example 3

360 parts of dimethylolurea are made into a fine suspension in 500 parts of dioxane. The suspension is then heated to 85° centigrade, treated with 4 parts of oxalic acid, and maintained at the same temperature while stirring until the splitting off of water and formaldehyde is completed. The finely powdered condensation product is then freed from dioxane by filtration, washed several times with ethyl ether and dried as described in Example 1. The condensation may be carried out for example in oil of turpentine instead of in dioxane.

The fine powder obtained may be pressed in moulds under a pressure of about 6.5 tons per square inch, and at from 100° to 110° centigrade. After pressing for 5 minutes the transparent homogeneous pressed pieces may be taken from the mould while still hot without a risk of distortion or cracking of the moulded pieces being incurred. The pulverulent products obtained in Examples 1 and 2 may also be employed instead of the condensation product prepared in dioxane.

*Example 4*

100 parts of urea are dispersed in 500 parts of a commercial aqueous solution of formaldehyde together with 5 parts of aqueous 50 per cent caustic potash solution the temperature being kept at room temperature by cooling. After some time an amorphous white product constituting an anhydride of two molecular proportions of dimethylol urea, slowly separates from the solution and after 24 hours the product is filtered off and washed with ethyl alcohol and ethyl ether. 90 parts of the product are then heated to 90° C. while stirring together with 135 parts of iso-butyl alcohol and 40 parts of a 5 per cent ethyl alcoholic solution of urea nitrate until the solution has become clear. The solution is then neutralized by stirring it with 10 parts of tertiary sodium phosphate and filtered after cooling.

50 parts of this solution are then stirred with from 250 to 500 parts of ethyl ether and treated as described in Example 1. The powder obtained is then pressed into moulds at from 100° C. to 110° C. at a pressure of 1000 kilograms per square centimetre. The resulting masses are similar to those obtainable in accordance with the process described in Example 3. The precipitated product can be employed also for the manufacture of lacquers for example according to Examples 1 and 2.

We claim:

1. In the production of resinous condensation products of carbamides and formaldehyde in the absence of water the step of adding to the reaction mixture at any stage a quantity of an organic liquid in which the condensation products are insoluble sufficient to precipitate the resinous condensation products.

2. The process for the production of resinous condensation products of carbamides and formaldehyde which comprises condensing a carbamide and formaldehyde in an anhydrous organic solvent, comprising an organic hydroxyl bearing substance and capable of dissolving the resinous condensation products, until resinous condensation products are formed and adding to the solution obtained a quantity of an organic liquid, in which the resinous condensation products are insoluble, sufficient to precipitate the resinous condensation products.

3. A modification of the process claimed in claim 2 which consists in replacing urea and formaldehyde by a methylol urea.

4. The process for the production of resinous condensation products of carbamides and formaldehyde which comprises condensing a urea and formaldehyde in an anhydrous organic solvent comprising an aliphatic alcohol, until a resinous condensation product is formed and adding to the solution of the resinous condensation product obtained a quantity of an organic liquid, in which the resinous condensation product is insoluble, sufficient to precipitate the resinous condensation product.

5. The process for the production of resinous condensation products of carbamides and formaldehyde which comprises condensing a urea and formaldehyde in an anhydrous organic solvent comprising an aliphatic alcohol, until a resinous condensation product is formed and adding to the solution obtained a quantity of ethyl ether sufficient to precipitate the resinous condensation product from the said solution.

In testimony whereof we have hereunto set our hands.

WILHELM PUNGS.
KARL EISENMANN.
JOHANN KUCHENBUCH.